Oct. 10, 1950     D. F. TOOT ET AL     2,525,190
STEERING-BY-DRIVING MECHANISM AND
ELECTRIC CONTROL THEREFOR

Filed Nov. 18, 1944     3 Sheets-Sheet 1

INVENTORS
David F. Toot
BY Victor E. Matulaitis

ATTORNEYS

Oct. 10, 1950 D. F. TOOT ET AL 2,525,190
STEERING-BY-DRIVING MECHANISM AND
ELECTRIC CONTROL THEREFOR
Filed Nov. 18, 1944 3 Sheets-Sheet 2

INVENTORS
David F. Toot
BY Victor E. Matulaitis
C. E. Herrstrom & H. E. Thibodeau
ATTORNEYS Patented Oct. 10, 1950

2,525,190

UNITED STATES PATENT OFFICE 2,525,190

STEERING-BY-DRIVING MECHANISM AND ELECTRIC CONTROL THEREFOR

David F. Toot, Huntington Woods, Mich., and Victor E. Matulaitis, Rochester, N. Y., assignors to Chrysler Corporation, Highland Park, Mich., a corporation of Delaware Application November 18, 1944, Serial No. 564,072

13 Claims. (Cl. 74—674)

This invention relates generally to steering mechanisms, and more particularly to improvements in steering mechanisms for motor vehicles.

Heretofore, track-laying vehicles such as tanks and tractors have been steered by means of mechanical friction brakes arranged to selectively retard the tracks on opposite sides of the vehicle. This type of steering mechanism inherently includes numerous disadvantages. For example, in operating a track-laying vehicle, even on smooth level ground, it is always necessary to do some corrective steering, since the slightest variation in the construction of the two tracks will cause the vehicle to drift in one direction or the other. Such corrective steering requires application of the friction brakes, either continuously or at very short intervals, resulting in excessive slippage between the parts of the brakes, and consequently excessive heat and wear. Not only is considerable physical effort required on the part of the driver, but inasmuch as the steering brakes are also used to retard the vehicle, this continued steering is likely to cause failure of the braking system. The steering controls usually comprise a pair of levers which are manipulated by the driver to retard the track on the side of the vehicle in the desired turning direction. Since nearly all drivers have been previously trained to steer vehicles by means of steering wheels, the use of levers requires additional training and is apt to result in accidents. A further disadvantage is an inherent lack of smoothness in steering, resulting in rough vehicle operation and the subjection of the entire vehicle structure to impact loads.

The above mentioned disadvantages in the conventional type of steering mechanism are eliminated or corrected by the present invention, in which the steering is accomplished by eddy current clutches, operating through a gearing arrangement which is not located in the main power train of the transmission, but in a separate unit under control of the eddy current clutches. Differential steering action is transmitted to the tracks through planetary gearsets located at the outer ends of the main drive shaft of the transmission. These planetary gearsets combine the power component from the transmission with the steering component from the eddy current clutches, and transmit the combined resultant component to the tracks to drive the latter. Since the steering component acts through the gearing arrangement in an opposite manner upon each planetary gearset, the two tracks are driven at different speeds, resulting in turning the vehicle in one direction or the other, depending upon the control of the eddy current clutches.

It is accordingly an object of the present invention to provide a steering mechanism eliminating appreciable wear and permitting both normal and corrective steering without causing excessive wear and the resulting possible failure of the steering and braking system.

Another object of the present invention is to provide a steering mechanism which may be easily, smoothly and accurately controlled by the operator by means of a normal steering operation and without any appreciable physical effort.

Still another object of the invention is to provide a steering mechanism inherently operating smoothly at all times, thereby eliminating impact loads upon the vehicle structure.

A further object of the present invention is to provide a steering mechanism in which the rate of change of direction of the vehicle depends upon engine speed rather than upon vehicle speed, thus materially improving maneuverability and handling characteristics, and automatically varying the turning radius in the different speed ranges.

Another object of the invention is to provide a steering mechanism in which it is impossible to greatly overload the steering mechanism or any of the connecting structure.

Other objects of the invention will be made more apparent as this description proceeds, particularly when considered in connection with the accompanying drawing in which.

Figure 1:
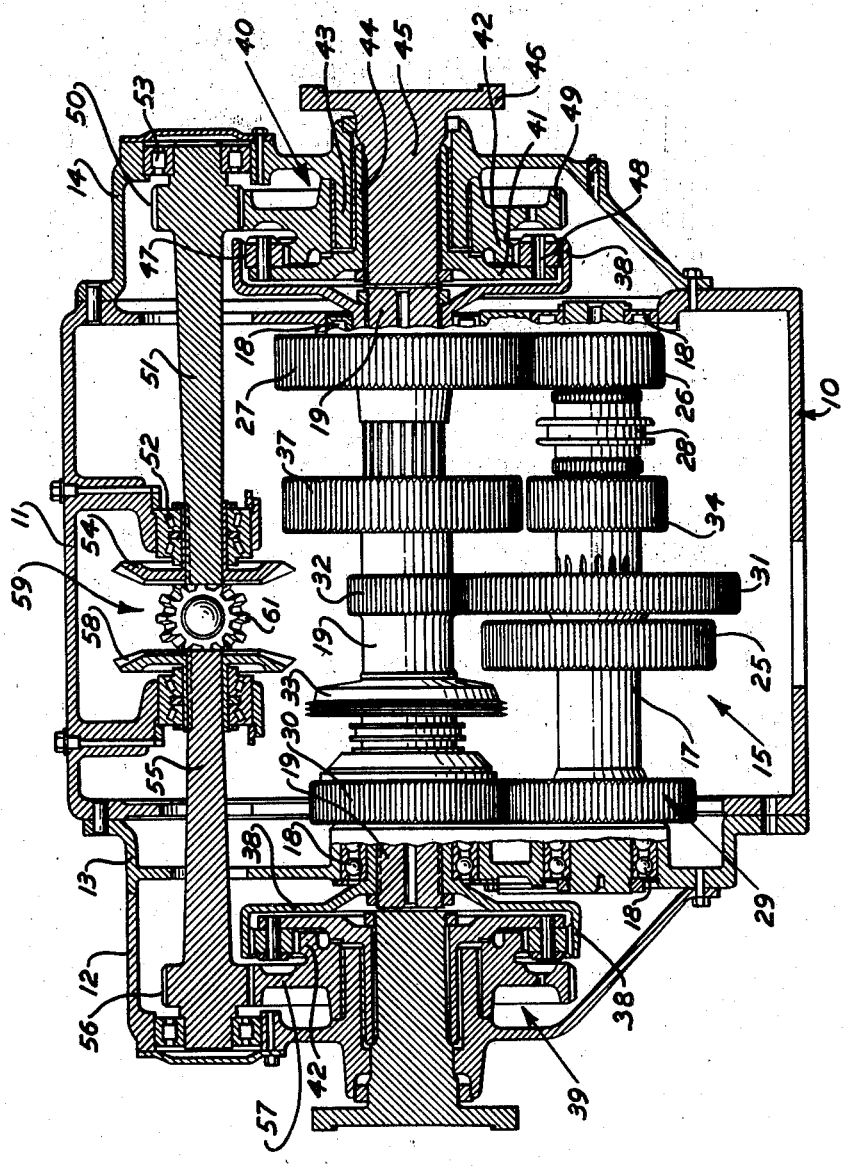
Figure 1 is a longitudinal vertical cross-section, partly in elevation, of a steering mechanism embodying our invention.
Figure 2:
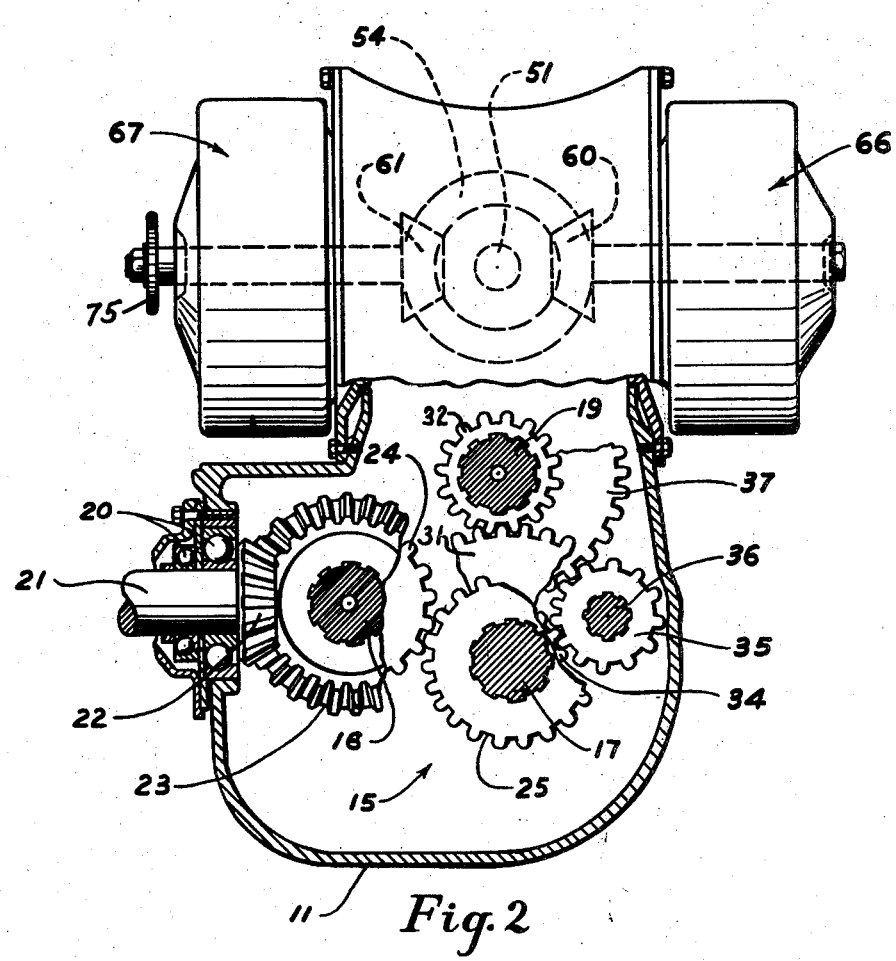
Figure 2 is a transverse vertical cross-section, partly in elevation, of the construction shown in Figure 1.

Referring now to the drawings, and particularly to Figures 1 and 2, the reference numeral 10 indicates generally a housing adapted to inclose the transmission of the vehicle as well as the steering mechanism thereof and comprising the center section 11 and the end sections 12, 13 and 14.

Although any suitable type of transmission may be used with the present construction, we have shown a conventional type transmission having three speeds forward and one speed reverse. The transmission 15 is of the spur gear type and is adapted to be actuated by synchronizer clutches. In detail, the transmission 15 includes two cross-shafts 16 and 17 suitably journalled in the end section 13 and the center section 11 of the housing 10 by means of the bearings 18. A drive shaft 19 is adapted to be driven from the cross-shafts 16 and 17 at the selected speed range and is connected to the drive sprockets of the vehicle by means to be hereinafter described.

Journalled in the center section 11 of the housing 10 by means of bearings 20 is an input shaft 21. Suitably secured to the inner end of the shaft 21 is a bevel gear 22, meshing with a bevel gear 23 splined on the cross-shaft 16. The input shaft 21 is connected to the engine (not shown), of the vehicle. Power is transmitted from the cross-shaft 16 to the cross-shaft 17 by means of the spur gears 24 and 25, which are splined on the shafts 16 and 17 respectively. The drive shaft 19 is driven at low speed by means of the gear 26 carried by the cross-shaft 17 and meshing with the gear 27 splined on the drive shaft 19. A conventional type synchronizer clutch 28 on the shaft 17 is adapted to be actuated to couple gear 26 to shaft 17 and to complete the power train to the drive shaft at low speed. In a similar manner drive shaft 19 is driven at intermediate speed by means of the inter-meshing gears 29 and 30 on shafts 17 and 19 respectively; and at high speed by the inter-meshing gears 31 and 32 on shafts 17 and 19 respectively. Suitable synchronizer clutches, such as 33, are utilized to effect the coupling at intermediate and high speeds. Reverse drive is obtained by actuating the synchronizer clutch 28 in the opposite direction from low speed to couple together gear 34 on the cross-shaft 17, gear 35 on the idler shaft 36 and gear 37 on the driveshaft 19.

From the foregoing it will be apparent that the drive shaft 19 of the transmission 15 is adapted to be driven at any one of three speeds forward and one speed reverse by suitable actuation of the synchronizer clutches.

Splined to the outer ends of the drive shaft 19 are a pair of annulus or internal ring gears 38, forming part of the planetary gearsets 39 and 40. Inasmuch as the planetary gearsets 39 and 40 are identical except for being located in reversed position, only one will be described in detail.

The planetary gearset 40 comprises three principal elements, namely, the above mentioned annulus gear 38, the planet pinion carrier 41 and the sun gear 42. Projecting inwardly from the outer wall of the end section 14 of the housing 10 is an axially extending annular boss 43. Formed integral with the planet carrier 41 is a sleeve 44, the latter being journalled within the boss 43. A stub-shaft 45 is splined in the sleeve 44 of the carrier, and is provided at its outer extremity with a coupling 46 adapted to be suitably connected to one of the drive sprockets, (not shown), of the vehicle. The sun gear 42 is journalled on the outer periphery of the boss 43 and meshes with the planet pinions 47, which in turn are rotatably carried upon pins 48 secured in the carrier 41. The pinions 47 also mesh with the annulus gear 38.

The annulus gear 38 being connected to the drive shaft 19 of the transmission forms the power input from the engine to the planetary gearset. The planet carrier 41 being connected to the stub-shaft 45 and to the drive sprockets through the coupling 46 forms the power output. The sun gear 42 is arranged to be driven in accordance with the steering control desired and forms the input for the steering component.

Formed integral with the sun gear 42 and positioned laterally therefrom is the spur gear 49. The gear 49 meshes with a pinion 50 formed on shaft 51, which is journalled in bearings 52 and 53 respectively carried in the center section 11 and the end section 14 of the housing 10. Similarly journalled in the housing is a shaft 55 carrying a pinion 56 meshing with a gear 57 formed integral with the sun gear 42 of the planetary gearset 39.

Figure 3:
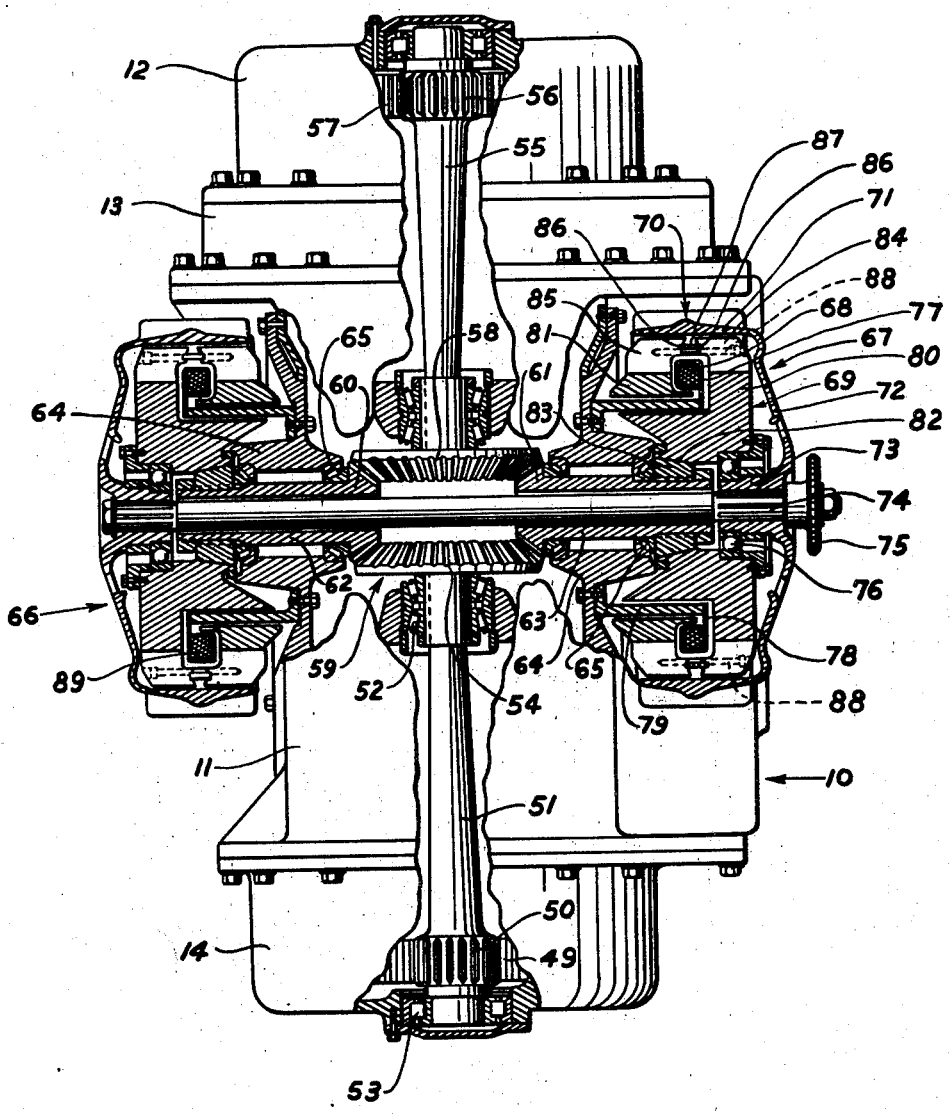
Figure 3 is a plan view, partly in section, of the construction shown in Figure 1.

Bevel gears 54 and 58 are keyed to the inner ends of the shafts 51 and 55 respectively and constitute the output gears of a gearing 59. As best shown in Figure 3 the gearing 59 also includes a pair of pinions 60 and 61 formed at the inner ends of sleeves 62 and 63 respectively, pinions 60 and 61 each being meshed with both bevel gears 54 and 58 as shown, thus forming in effect a quadrilateral bevel gearing arrangement with the four shafts of the gears at right angles, wherein pinion 60 with its sleeve 62 is oppositely rotatable with respect to pinion 61 with its sleeve 63, while bevel gear 54 with its shaft 51 is oppositely rotatable with respect to bevel gear 58 with its shaft 55. The sleeves 62 and 63 are journalled in the wall 64 of the housing by means of bearings 65. The pinions 60 and 61 of the gearing 59 are adapted to be actuated by the eddy current clutches 66 and 67 respectively. Except for being located in reversed position, the clutches 66 and 67 are identical in construction, and accordingly only clutch 67 will be described.

The eddy current clutch 67 includes as its principal elements a stationary field coil 68, an intermediate rotor 69 and an outer rotor 70. The outer rotor 70 has an axially extending flange 71 of magnetic material, a web 72 and a hub 73, the latter being splined on the shaft 74. The shaft 74 extends freely through sleeves 62 and 63, and has at its outer extremity a sprocket 75 which in turn is connected to a power takeoff from the engine of the vehicle. Bearings 76 are provided within the intermediate rotor 69 and revolubly support hub 73 of the outer rotor 70.

The stationary field coil 68 of the eddy current clutch 67 is annular in cross section and is inclosed within a casing 77. The casing 77 has a radially inwardly extending flange 78 suitably secured to the outer end of an annular bracket 79, the latter being bolted to the wall 64 of the housing 10. The field coil 68 is energized and controlled by means to be hereinafter described.

The intermediate or pole-carrying rotor 69 is formed in two sections, an axially outer section 80 and an axially inner section 81. The hub 82 of the section 80 is splined on a sleeve 83 which in turn is splined on the sleeve 63. The outer periphery of the sections 80 and 81 are formed with a plurality of spaced poles 84 and 85.

The rotor section 81 is carried by the section 80 and rotates therewith as a unit. Each of the sections 80 and 81 is formed with an annular groove 86 adapted to receive an annular ring 87, the latter being preferably formed of non-magnetic material. The ring 87 serves as a spacer between the two sections of the rotor and said sections are secured together by means of bolts 88.

As shown in Figure 3, clearance is provided between the axial flange 71 of the outer rotor 70, and the poles 84 and 85 of the intermediate rotor 69. Clearance is also provided between the casing 77 surrounding the stationary field coil 68 and the sections 80 and 81 of the rotor 69. The aforementioned clearances provide the necessary magnetic gaps between the stationary field coil 68 and the two rotors, so that upon actuation of the field coil the intermediate rotor 69 is located in a field of magnetic flux between the field coil and the engine-driven outer rotor 70. Energization of the stationary field coil 68 causes the intermediate rotor 69 to rotate at a fraction of the speed of the outer rotor 70, the exact speed being dependent upon the amount of current supplied to the field coil.

Figure 4:
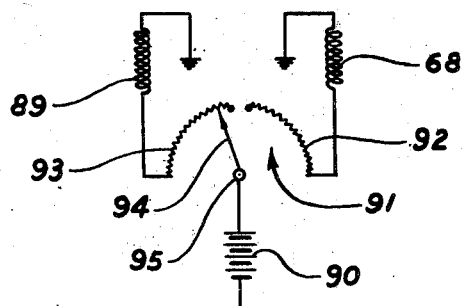
Figure 4 is a diagrammatical view of the electrical steering controls.

The electrical system for energizing the field coils of the two eddy current clutches and for regulating the latter is diagrammatically shown in Figure 4. In the diagram 68 and 89 are the field coils of the two eddy current clutches 67 and 66 respectively, and 90 is the source of electrical power. Intermediate the electrical power source and the field coils is a rheostat 91 having a pair of windings 92 and 93, the winding 92 being in the circuit of the field coil 68 and the winding 93 being in the circuit of field coil 89. A contact arm 94 is pivoted at 95 and is adapted to be manually controlled by any suitable means. For example, the arm 94 may be connected to a conventional type steering wheel, (not shown).

Operation

During normal operation of the vehicle in a straight line, the steering wheel and the contact arm 94 are positioned in a neutral location between the windings 92 and 93 of the rheostat, and no current is supplied to either of the field coils 68 and 89 of the eddy current clutches 67 and 66 respectively. Accordingly no magnetic field is generated in either clutch and the intermediate pole-carrying rotors 69 remain stationary. It follows that the gear trains between the clutches and the planetary gearsets are also stationary, including the input pinions 60 and 61 and the output gears 54 and 58 of the gearing 59, shafts 51 and 55, gears 50 and 56, gears 49 and 57, and the sun gears 42.

Rotation of the annulus gears 38 by means of the drive shaft 19 of the transmission then results in a direct transmission of power through the planet pinions 47 to the planet carriers 41 and to the drive sprockets of the vehicle which are connected to the carriers 41 through the shafts 45, as hereinbefore described. It will thus be seen that the drive sprockets on opposite sides of the vehicle are rotated in the same direction and at the same speed when no steering control is applied. At this time the gearing 59 provides true gearing action between the two drive sprockets, and thereby provides even distribution of tractive efforts to the two tracks.

To steer the vehicle, one track is retarded, and the opposite track is correspondingly increased in speed. This is accomplished by the previously described mechanism in the following manner:

During steering of the vehicle in either direction only one of the eddy current clutches is energized. To steer the vehicle the rheostat 91 is actuated to energize one of the eddy current clutches and to steer the vehicle in the opposite direction the rheostat is oppositely actuated to energize the other eddy current clutch. For example, if it is desired to turn the vehicle to the right by increasing the speed of the track driven by the drive sprocket connected to the shaft 45, the manual control means, which is preferably a steering wheel, is turned to contact the arm 94 with the winding 92 of the rheostat 91, thus energizing the stationary field coil 68 of the eddy current clutch 67. The resulting magnetic field causes the rotor 69 to rotate in the same direction as the engine driven rotor 70 and at a fraction of the speed thereof. The amount of slippage between the rotor 69 and the rotor 70 is dependent upon the amount the steering wheel is turned and the resulting position of the arm 94 of the rheostat. Accordingly the speed of the rotor 69 is continuously variable from a standstill to a maximum and can be accurately controlled by the operator.

It will be seen that the steering control is effortless inasmuch as only the friction of the rheostat need be overcome. As a result, the steering mechanism operates smoothly and the vehicle can be steered without subjecting the vehicle to unnecessary impact loads. In addition the device readily lends itself to a conventional type of manual control means such as a steering wheel, and thus enables the driver to steer the vehicle in a manner similar to a wheeled vehicle.

Actuation of the pole-carrying rotor 69 of the clutch 67 applies power through the sleeves 83 and 63 to the input pinion 61 of the gearing 59, which in turn rotates the output gears 54 and 58 of the gearing 59 in opposite directions and at the same speed. The input pinion 60 is necessarily rotated and results in rotation of the pole carrying rotor of the eddy current clutch 66, but inasmuch as no current is being supplied to the field coil of this clutch, the rotor can rotate freely.

Rotation of the output gear 54 of the gearing 59 rotates the sun gear 42 of the planetary gearset 40 in one direction through the shaft 51, pinion 50 and gear 49. Simultaneously, rotation of the output gear 58 of the gearing 59 effects a rotation of the sun gear 42 of the planetary gearset 39 in the opposite direction through shaft 55, pinion 56, and gear 57. Assuming that the sun gear 42 of the planetary gearset 40 is thus rotated in the opposite direction from the annulus gear 38, the speed of the planet carrier 41 will be decreased thereby decreasing the speed of the drive sprocket and the track at that side of the vehicle. Since the sun gear of the opposite planetary gearset 39 is now being rotated through the gearing 59 in the same direction as the adjacent annulus gear, the planet carrier driven thereby will be increased in speed thereby increasing the speed of the drive sprocket and the track at that side of the vehicle. In this manner the track at one side of the vehicle is decreased in speed and, simultaneously, the track at the opposite side is increased in speed, resulting in turning the vehicle in the direction of the side of the vehicle whose track is retarded.

It will be seen that the speed of each of the tracks is dependent upon two factors, namely, the output speed of the drive shaft 19 of the transmission 15, and the speed component received from the steering controls. In other words, the output speed of the transmission is modified and either increased or decreased by means of the steering component. Since the outer rotors of the eddy current clutches are driven directly by the engine, the steering component is independent of the speed of drive-shaft 19 of the transmission, and the rate of change of direction of the vehicle, in degrees per second, is directly proportional to the steering control and independent of the particular speed range at which the transmission is set. Accordingly, with the same engine speed and the same degree of steering control the vehicle will make a sharper turn in low gear than in high gear. Thus the minimum steering radius is automatically variable, depending upon vehicle speed. This is an important safety factor since it prevents the possibility of overturning the vehicle due to too sharp a turn at high speeds.

It should be noted that with the transmission in neutral and the vehicle standing still, it is possible to pivot the vehicle on its own center by driving the two tracks in opposite directions and at the same speed. At this time the annulus gears 38 of the planetary gearset are stationary and the entire driving power and speed is derived from the sun gears which are actuated by the eddy current clutches.

In normal vehicle operation, it is nearly always necessary to do some corrective steering since any variation in the construction of the two tracks will cause the vehicle to creep in one direction or the other, even on level ground. On uneven ground it is always necessary to apply some corrective steering. For example, on a cambered road the vehicle will tend to turn downwardly and this must be compensated for by steering the vehicle in the opposite direction. With friction type brakes and steering clutches heretofore used, this continual corrective steering resulted in excessive heat and wear of the brake surfaces, often resulting in failure of the steering and brake machanism. In the present invention corrective steering is easily accomplished since the eddy current clutches have no wearing parts and the necessary slippage in the clutch is available without wear of the parts thereof. The heat generated in the clutch can be easily controlled by conventional means, as for example, by circulating a coolant through the clutch.

Whereas in a friction type mechanism, it is necessary to apply the steering brakes at very short intervals to correct the tendency of the vehicle to drift or creep to one side, in the present construction the corrective steering is accomplished easily and smoothly by simply turning the steering wheel slightly in the opposite direction. Due to the fact that the steering control is continuously variable, exceptionally smooth and accurate steering is possible.

Inasmuch as an inherent characteristic of the eddy current clutch is its ability to transmit only a limited amount of torque it is impossible to subject the connecting structure of the steering mechanism to a greater torque. This prevents overloading of the mechanism and is a safety factor limiting the allowable torque input to the designed value of the structure. This is not true of friction type devices, which if overloaded, will either burn themselves out, or if large enough to take the full torque will greatly overload the connecting mechanism, and possibly result in failure thereof.

The mechanism described above is particularly adapted to be positioned in a vehicle so that the drive shaft 19 of the transmission extends transversely thereof, thus positioning the clutches 46 adjacent to the drive sprockets of the tracks for direct connection thereto. It is possible, however, to design the connecting structure so that the steering mechanism and transmission may be positioned in any part of the vehicle, and in any relative position. Likewise, although we have described our steering mechanism as being particularly adapted for use in connection with a track-laying vehicle, such as a military tank or a tractor, the mechanism may also be used to advantage with other vehicles. Similarly, the steering mechanism will operate equally well with other type transmissions, and in certain instances may be used with a direct engine drive without the use of an intervening transmission.

Although we have shown and described certain embodiments of the invention, it will be understood that we do not wish to be limited to the exact construction shown and described, but that various changes and modifications may be made without departing from the spirit and scope of our invention as defined in the appended claims.

What we claim is:

1. In a steering mechanism for track-laying motor vehicles having an engine, a transmission, and a pair of drive sprockets on opposite sides of the vehicle, the combination of a pair of eddy current clutches each having a first rotor connected to said engine to receive drive therefrom, a second rotor and a stationary field coil, said second rotors being arranged for relative opposite rotation, a pair of planetary gearsets each having an annulus gear connected to said transmission, a planet gear carrier connected to one of said drive sprockets, and a sun gear connected to said second rotor of one of said eddy current clutches, control means for selectively energizing and regulating the strength of one of said field coils to vary the speed of said rotors, the operation of one of said eddy current clutches being effective to steer the vehicle in one direction, and the operation of the other eddy current clutch being effective to steer the vehicle in the opposite direction.

2. In a steering mechanism for track-laying motor vehicles having an engine, a transmission, and a pair of drive sprockets on opposite sides of the vehicle, the combination of a pair of eddy current clutches each having two rotors and a stationary field coil, means providing a power input from said engine to one of said rotors of each of said clutches, a pair of planetary gearsets each having one element thereof driven by said transmission and a second element thereof connected to one of said drive sprockets, gearing connecting each of the other of said two rotors in opposite rotative relationship to a third element of one of said planetary gearsets, control means for selectively energizing and regulating the strength of one of said field coils to vary the relative speed of said rotors, the operation of one of said eddy current clutches being effective through said gearing and said planetary gearsets to increase the speed of one of said drive sprockets and simultaneously decrease the speed of the other drive sprocket to steer the vehicle in one direction, and the operation of the other eddy current clutch being effective through said gearing and said planetary gearsets to increase the speed of said last named drive sprocket and simultaneously decrease the speed of said first named drive sprocket to steer the vehicle in the opposite direction.

3. In a steering mechanism for track-laying motor vehicles having an engine, a transmission, and a pair of drive sprockets on opposite sides of the vehicle, the combination of a pair of eddy current clutches each having two rotors and a stationary field coil, means providing a power input from said engine to one of said rotors of each of said eddy current clutches, gearing having a pair of input gears and a pair of output gears, each of said input gears being connected to the other of said rotors of one of said pair of eddy current clutches, a pair of planetary gearsets each having an annulus gear connected to said transmission, a planet gear carrier connected to one of said drive sprockets, and a sun gear connected to one of the output gears of said gearing, control means for selectively energizing and regulating the strength of one of said field coils to vary the speed of the other of said rotors, the operation of one of said eddy current clutches being effective through said gearing and said planetary gearsets to increase the speed of one of said drive sprockets and simultaneously decrease the speed of the other drive sprocket to steer the vehicle in one direction, and the operation of the other eddy current clutch being effective through said gearing and said planetary gearsets to increase the speed of said last named drive sprocket and simultaneously decrease the speed of said first named drive sprocket to steer the vehicle in the opposite direction.

4. In a vehicle having an engine and a drive member, the combination of a speed change unit associated with the engine, a planetary gearset having one element thereof driven by said speed change unit and a second element thereof connected to said drive member to drive the latter, a rotor driven by said engine, a second rotor adjacent said first mentioned rotor and operatively connected to a third element of said planetary gearset, an electric field coil adjacent said rotors, and control means adapted to selectively energize and regulate the strength of said field coil to vary the speed of said second rotor and said drive member.

5. In a steering mechanism for vehicles having an engine and a pair of drive members driven by the engine and on opposite sides of the vehicle, in combination, a pair of eddy current clutches, each of said eddy current clutches having rotors and a stator provided with a field coil, means connecting one of said rotors of each of said eddy current clutches to said engine, gearing connecting other of said rotors of each of said eddy current clutches for relative opposite rotation, means connecting said gearing to said drive members, and control means for selectively energizing and regulating the strength of one of said field coils to vary the speed of the associated one of the last named rotors and to thereby vary the speed of said drive members to steer the vehicle.

6. In a steering mechanism for vehicles having an engine and a pair of drive members driven by the engine and on opposite sides of the vehicle, in combination, a pair of eddy current clutches, each of said eddy current clutches having two rotors and a stator provided with a field coil, one of said rotors being driven by said engine and the other operatively connected to one of said drive members, and control means for selectively energizing and regulating the strength of one of said field coils to vary the speed of the associated one of the last named rotors and to thereby vary the speed of said drive members to steer the vehicle.

7. In a steering mechanism for vehicles having an engine and a pair of drive members driven by the engine and on opposite sides of the vehicle, in combination, a pair of eddy current clutches, each of said eddy current clutches having two rotors and a stator provided with a field coil, one of said rotors being driven by said engine, gearing, means connecting said gearing to said drive members, means connecting the other rotor of each eddy current clutch to opposite sides of said gearing for relative opposite rotation, and control means for selectively energizing and regulating the strength of one of the field coils of said eddy current clutches to increase the speed of the associated one of the last named rotors, the rotating force of said associated one of the last named rotors being transmitted through said gearing to said drive members causing one of said members to increase and the other to decrease in speed.

8. In a steering mechanism for vehicles having an engine and a pair of drive members on opposite sides of the vehicle, the combination of a speed change unit operatively connected to said engine, a pair of planetary gearsets each interconnecting said speed change unit with one of said drive members, a pair of eddy current clutches each having rotors and a stator provided with a field coil, means providing a power input from said engine to one of said rotors of each of said eddy current clutches, gearing between said planetary gearsets, means connecting other of said rotors of said eddy current clutches to opposite sides of said gearing for relative opposite rotation, and control means for selectively energizing and regulating the strength of one or the other of said field coils of said eddy current clutches to vary the speed of the associated one of the last named rotors, the rotating force of said associated one of the last named rotors being transmitted through said gearing and said planetary gearsets to said drive members causing one of said drive members to increase and the other to decrease in speed.

9. In a steering mechanism for track-laying motor vehicles having an engine, a transmission, and a pair of drive sprockets on opposite sides of the vehicle, the combination of a pair of eddy current clutches each having a pair of rotors and a stationary field coil, control means for selectively energizing and regulating one of said field coils to vary the speed of one of the associated pair of rotors, gearing interconnecting said one of the associated pair of rotors of each of said eddy current clutches for relative opposite rotation, and means connecting said gearing to said drive sprockets, the operation of one of said eddy current clutches being effective to vary the relative speeds of said drive sprockets to steer the vehicle in one direction, and the operation of the other eddy current clutch being effective to oppositely vary the relative speeds of said drive sprockets to steer the vehicle in the opposite direction.

10. In a steering mechanism for track-laying motor vehicles having an engine, a transmission, and a pair of drive sprockets on opposite sides of the vehicle, the combination of a pair of eddy current clutches each having a pair of rotors and a stationary field coil, one rotor of each clutch being driven by said engine and the other of said rotors being connected to one of said drive sprockets, said other of said rotors of both clutches being arranged for simultaneous relative opposite rotation, and control means for selectively energizing and regulating the strength of one of said field coils to vary the speed of the associated one of the last named rotors, the operation of one of said eddy current clutches being effective to vary the relative speeds of said drive sprockets to steer the vehicle in one direction, and the operation of the other of said eddy current clutches being effective to oppositely vary the relative speeds of said drive sprockets to steer the vehicle in the opposite direction.

11. In a steering mechanism for track-laying motor vehicles having an engine, a transmission, a pair of drive sprockets on opposite sides of the vehicle, and means connecting said transmission to said drive sprockets, the combination of a pair of eddy current clutches each having an outer rotor, an intermediate rotor and a stationary field coil, said outer rotors being connected for simultaneous rotation by said engine, gearing connecting said intermediate rotors for simultaneous opposite relative rotation, control means for selectively energizing and regulating the strength of one of said field coils to vary the speed of the associated one of said intermediate rotors, and means connecting said gearing to each of said drive sprockets, the operation of one of said eddy current clutches being effective through said gearing to increase the speed of one of said drive sprockets and simultaneously decrease the speed of the other of said drive sprockets to steer the vehicle in one direction, and the operation of the other of said eddy current clutches being effective through said gearing to increase the speed of the last named drive sprocket and simultaneously decrease the speed of the first named drive sprocket to steer the vehicle in the opposite direction.

12. In a steering mechanism for track-laying motor vehicles having an engine, a transmission, a pair of drive sprockets on opposite sides of the vehicle, and means connecting said transmission to said drive sprockets, the combination of a pair of eddy current clutches each comprising two rotors and a stationary field coil, one of said rotors being drivingly connected to said engine, gearing having a pair of oppositely rotatable input gears each meshing with a pair of oppositely rotatable output gears, each of said input gears being connected to the other of said rotors of one of said eddy current clutches and each of said output gears being connected to one of said drive sprockets, and control means for selectively energizing and regulating the strength of one of said field coils to vary the speed of the associated one of said other of said rotors, the operation of one of said eddy current clutches being effective through said gearing to increase the speed of one of said drive sprockets and simultaneously decrease the speed of the other drive sprocket to steer the vehicle in one direction, and the operation of the other of said eddy current clutches being effective through said gearing to increase the speed of the last named drive sprocket and simultaneously decrease the speed of the first named drive sprocket to steer the vehicle in the opposite direction.

13. In a steering mechanism for track-laying motor vehicles having an engine, a transmission, and a pair of drive sprockets on opposite sides of the vehicle, the combination of a pair of eddy current clutches each having a first rotor connected to said engine to receive a drive therefrom, a second rotor and a stationary field coil, said second rotors being arranged for relative opposite rotation, a pair of planetary gearsets each having one element thereof driven by said transmission and a second element thereof connected to one of said drive sprockets, means connecting a third element of each of said planetary gearsets to said second motor of one of said eddy current clutches, control means for selectively energizing and regulating the strength of one of said field coils to vary the speed of the associated one of said second rotors, the operation of one of said eddy current clutches being effective to steer the vehicle in one direction, and the operation of the other of said eddy current clutches being effective to steer the vehicle in the opposite direction.

DAVID F. TOOT.
VICTOR E. MATULAITIS.

REFERENCES CITED

The following references are of record in the file of this patent:

UNITED STATES PATENTS

| Number | Name | Date |
|---|---|---|
| 1,227,185 | Neuland | May 22, 1917 |
| 1,247,725 | Schneider | Nov. 27, 1917 |
| 1,283,211 | Kintzing | Oct. 29, 1918 |
| 1,688,643 | Murfey et al. | Oct. 23, 1928 |
| 1,984,830 | Higley | Dec. 18, 1934 |
| 2,012,698 | Terrill | Aug. 27, 1935 |
| 2,047,050 | Armington | July 7, 1936 |
| 2,272,934 | Cotal | Feb. 10, 1942 |
| 2,314,664 | Shenstone | Mar. 23, 1943 |

FOREIGN PATENTS

| Number | Country | Date |
|---|---|---|
| 781,404 | France | May 15, 1935 |